US011831022B2

(12) United States Patent
Zhang

(10) Patent No.: US 11,831,022 B2
(45) Date of Patent: Nov. 28, 2023

(54) POSITIVE CURRENT COLLECTOR AND PREPARATION METHOD THEREOF, POSITIVE ELECTRODE SHEET, CELL AND BATTERY

(71) Applicant: XIAMEN HITHIUM ENERGY STORAGE TECHNOLOGY CO., LTD., Fujian (CN)

(72) Inventor: Qin Zhang, Guangdong (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 38 days.

(21) Appl. No.: 17/856,996

(22) Filed: Jul. 3, 2022

(65) Prior Publication Data

US 2022/0344667 A1    Oct. 27, 2022

Related U.S. Application Data

(63) Continuation of application No. PCT/CN2020/142528, filed on Dec. 31, 2020.

(30) Foreign Application Priority Data

Jan. 3, 2020  (CN) ......................... 202010009329.X
Jan. 3, 2020  (CN) ........................... 202020013752.2

(51) Int. Cl.
   *H01M 4/70*   (2006.01)
   *H01M 4/66*   (2006.01)
(52) U.S. Cl.
   CPC .................................. *H01M 4/661* (2013.01)
(58) Field of Classification Search
   None
   See application file for complete search history.

(56) References Cited

U.S. PATENT DOCUMENTS

| 2011/0129701 A1* | 6/2011 | Seo ..................... H01M 50/54 |
| | | 429/153 |
| 2013/0065124 A1 | 3/2013 | Morishima et al. |
| 2019/0173088 A1* | 6/2019 | Liang .................. H01M 4/668 |

FOREIGN PATENT DOCUMENTS

| CN | 102082286 A | 6/2011 |
| CN | 108736016 A | 11/2018 |

(Continued)

OTHER PUBLICATIONS

English translation of CN 208433464 (Year: 2019).*

(Continued)

*Primary Examiner* — Yoshitoshi Takeuchi

(57) ABSTRACT

Provided are a positive current collector, a preparation method thereof, a positive electrode sheet, a cell and a battery. The positive current collector. The positive current collector includes a substrate film and a functional layer arranged on a surface of the substrate film. The substrate film has a first surface and a second surface opposite to the first surface. The first surface has a first functional layer provided thereon, and the second surface has a second functional layer provided thereon. The first functional layer includes a bonding layer, a current conducting layer, and a protective layer that are stacked sequentially. The bonding layer is arranged on the first surface. The first functional layer is divided to have a first functional segment and a second functional segment in a direction parallel to the first surface. The first functional segment has a thickness greater than a thickness of the second functional segment.

20 Claims, 4 Drawing Sheets

(56) References Cited

FOREIGN PATENT DOCUMENTS

| CN | 208433464 | * | 1/2019 | ............. H01M 4/64 |
| --- | --- | --- | --- | --- |
| CN | 208433464 U | | 1/2019 | |
| CN | 109873161 A | | 6/2019 | |
| CN | 211088396 U | | 7/2020 | |
| CN | 211088397 U | | 7/2020 | |

OTHER PUBLICATIONS

International Search Report and Written Opinion dated Mar. 19, 2021 in International Application No. PCT/CN2020/142528. English translation attached.

* cited by examiner

POSITIVE CURRENT COLLECTOR AND PREPARATION METHOD THEREOF, POSITIVE ELECTRODE SHEET, CELL AND BATTERY

CROSS-REFERENCE TO RELATED APPLICATION

The present application is a continuation of International Application No. PCT/CN2020/142528, filed on Dec. 31, 2020, which claims priority to Chinese Patent Application No. 202010009329.X, filed with China National Intellectual Property Administration on Jan. 3, 2020, titled "POSITIVE CURRENT COLLECTOR AND PREPARATION METHOD THEREOF, POSITIVE ELECTRODE SHEET, CELL AND BATTERY", and Chinese Patent Application No. 2020200137522, titled "POSITIVE CURRENT COLLECTOR, POSITIVE ELECTRODE SHEET AND BATTERY", filed on Jan. 3, 2020, the entire disclosure of which is incorporated herein by reference.

TECHNICAL FIELD

The present disclosure relates to the field of battery electrode sheet technologies, and in particular, to a positive current collector and a preparation method thereof, a positive electrode sheet, a cell, and a battery.

BACKGROUND

As an important component of a lithium-ion battery, a current collector can support active materials and conduct a current. A positive current collector generally includes a separator section coated with a positive electrode active material and a tab segment welded to a top cover. A foil of the current positive current collector has a uniform thickness. Such a structure has the problems of material waste and high cost. It is reported that reducing a thickness of the separator region can decrease the cost. However, this structure has reduced electrical conductivity and current conductivity.

SUMMARY

The present disclosure aims to provide a positive current collector, a preparation method thereof, a positive electrode sheet, a cell, and a battery, to improve the technical problem of low electrical conductivity and current conductivity of the positive current collector.

In a first aspect, embodiments of the present disclosure provide a positive current collector, including: a substrate film having a first surface and a second surface opposite to the first surface; and a functional layer arranged on a surface of the substrate film and including a first functional layer provided on the first surface of the substrate film and a second functional layer provided on the second surface of the substrate film. The first functional layer includes a bonding layer, a current conducting layer, and a protective layer that are stacked sequentially. The bonding layer is arranged on the first surface. The first functional layer is divided to have a first functional segment and a second functional segment in a direction parallel to the first surface. The first functional segment has a thickness greater than a thickness of the second functional segment. The first functional segment includes a first coating segment and a tab segment. The first coating segment has a surface to be coated with a material, and the tab segment has a surface to be connected to a tab. The first coating segment is arranged between the tab segment and the second functional segment.

The positive current collector has functional layers with the nonuniform thicknesses, so that the thickness of the second functional layer is smaller than the thickness of the first functional layer. The surface of the second functional layer is a coating region. With this structure, the coating region can be coated with more active materials, thereby increasing an energy density of the positive current collector. The first functional layer includes the tab segment, and a surface of the tab segment is the tab region configured to be connected to the tab. The first coating segment is arranged between the tab segment and the second functional segment, and a thickness of the first coating segment is equal to a thickness of the tab segment. By increasing the thickness of the functional layer at the connection between the coating segment and the tab segment, the electrical conductivity and the current conductivity at the connection between the coating segment and the tab segment can be enhanced, thereby improving comprehensive overcurrent capability of the positive current collector.

In a possible implementation manner, a ratio of the thickness of the first functional segment to the thickness of the second functional segment is (5 to 25):(1 to 15). In some embodiments of the present disclosure, the thickness of the first functional segment is in a range of 500 nm to 2500 nm, and the thickness of the second functional segment is in a range of 100 nm to 1500 nm.

The thickness of the first functional segment and the thickness of the second functional segment affect the current conductivity between the tab region and the coating region. After a lot of experimental research, when the ratio of the thickness of the first functional segment to the thickness of the second functional segment is within the above range, the electrical conductivity of the tab region can be ensured, and the electrical conductivity of the coating region can be greatly improved.

In a possible implementation, the surface of the first coating segment has a size ranging from 0.5 nm to 25 nm in the direction parallel to the first surface.

The first coating segment is at a region where the coating region is thickened, and when a thickening width of the first coating segment is within the above range, the overcurrent capability of the positive current collector can be better improved.

In a possible implementation, the second functional segment includes a second coating segment and a third coating segment. The second coating segment is arranged between the first coating segment and the third coating segment, and has a thickness gradually decreasing from an end close thereof to the first coating segment to an end thereof close to the third coating segment.

The second coating segment is connected to the first coating segment. With this structure, it is possible to allow a thickness change of the first coating segment and the thickness change of the second coating segment to become gradually reduced, which enhances the current conductivity between the second functional segment and the first functional segment, thereby improving the comprehensive overcurrent capability of the functional layer. Meanwhile, the structure can avoid the film surface defects of dead wrinkle and bulging due to the different thickness of the functional layer.

In a possible implementation, the second coating segment has a flat surface or a curved surface. In some embodiments of the present disclosure, each of the second coating segment and the third coating segment has a flat surface, and an included angle formed between the flat surface of the second coating segment and the flat surface of the third coating segment ranges from 1 degree to 50 degrees.

The surface shape of the second coating segment may be adjusted as desired, so that the positive current collector is not affected by bending during its practical application.

In a possible implementation, the current conducting layer includes 2 to 50 metal layer and 1 to 49 reinforcement layer that are alternately stacked. Each of the metal layer has a thickness in a range of 20 nm to 1500 nm, and each of the reinforcement layer has a thickness in a range of 2 nm to 50 nm. In a possible implementation, the substrate film has a thickness in a range of 1.2 μm to 12 μm, the bonding layer has a thickness in a range of 2 nm to 50 nm, and the protective layer has a thickness in a range of 2 nm to 50 nm.

The metal layer and the reinforcement layer are alternately stacked within the layer thickness range as described above, which can ensure the current conductivity of the current conducting layer to a greater extent while ensuring the current conducting layer has better stability. The substrate film, the bonding layer, the current conducting layer, and the protective layer has the thicknesses within the above ranges, which can allow the current conducting layer to be firmly connected to the substrate film by the bonding layer, so that the positive current collector has better peel strength.

In a possible implementation, the second functional layer is of a same structure as the first functional layer, and the second functional layer and the first functional layer are symmetrically arranged with respect to the substrate film. The positive current collector of the structure has good electrical conductivity and current conductivity.

In a possible implementation, the metal layer is an aluminum layer. The reinforcement layer is a non-metallic layer, and is composed of AlOx, where $1 \leq x \leq 1.5$. The protective layer is a non-metallic layer, and is composed of AlOx, where $1 \leq x \leq 1.5$. The positive current collector containing the aluminum layer has better electrical conductivity and current conductivity.

In a second aspect, a preparation method of the above positive current collector is provided, including: forming the bonding layer on the first surface and the second surface of the substrate film; forming the current conducting layer on the bonding layer; and forming the protective layer on the current conducting layer. The positive current collector with a nonuniform thickness can be obtained by this preparation method.

In a possible implementation, the current conducting layer includes a metal layer and a reinforcement layer that are alternately stacked, and has a nonuniform thickness. Forming the current conducting layer includes: step 1: coating a perfluoropolyether oil on a part of a surface of the bonding layer corresponding to the second functional segment, and then aluminizing a surface of the bonding layer. In some embodiments of the present disclosure, the second functional segment includes a second coating segment and a third coating segment. The second coating segment is arranged between the first functional segment and the third coating segment. The perfluoropolyether oil is coated on a part of the surface of the bonding layer corresponding to the first coating segment and the part of the surface of the bonding layer corresponding to the second functional segment to form a coating layer with a thickness gradually decreasing from the part of the surface of the bonding layer corresponding to the first coating segment towards the part of the surface of the bonding layer corresponding to the second functional segment; step 2: forming the reinforcement layer on the aluminum layer formed in the step 1; and step 3: aluminizing the reinforcement layer obtained in the step 2 to form an aluminum layer, to obtain a current conducting layer with a nonuniform thickness. In some embodiments of the present disclosure, repeating steps 2 and 3 to form the reinforcement layer and the aluminum layer that are alternately stacked, until the current conducting layer has a predetermined thickness.

The method employs the perfluoropolyether oil to hinder the formation of the aluminum layer, so as to obtain the current conducting layer with the nonuniform thickness.

In a possible implementation, the current conducting layer includes a metal layer and a reinforcement layer that are alternately stacked, and has a nonuniform thickness. Forming the current conducting layer includes: step 1: arranging a water-cooling baffle between a surface of the bonding layer corresponding to the second functional segment and an evaporation source. The water-cooling baffle has a plurality of through-holes defined therein. The plurality of through-holes is configured to allow vapor to pass therethrough and arranged at an arrangement density gradually decreasing in a direction from the first functional segment to the second functional segment. The part of the surface of the bonding layer is aluminized by evaporation deposition; step 2: forming the reinforcement layer on an aluminum layer obtained in the step 1; and step 3: forming an aluminum layer on the reinforcement layer obtained in the step 2 by the evaporation deposition in the step 1, to obtain a current conducting layer with a nonuniform thickness. In some embodiments of the present disclosure, steps 2 and 3 is repeated to form the reinforcement layer and the aluminum layer that are alternately stacked, until the current conducting layer has a predetermined thickness.

In this method, the water-cooling baffle is employed and modified in structure. Further, the current conducting layer with the nonuniform thickness can be obtained through evaporation deposition.

In a possible implementation, forming the reinforcement layer on an aluminum layer includes: placing an aluminized film, an outermost layer of which is the aluminum layer, in an environment with a humidity less than 50% and keeping the aluminized film stationary for 46 to 50 hours to form the reinforcement layer on the aluminum layer; or cleaning and oxidizing a surface of the aluminum layer through using a plasma device to ionize argon and oxygen to form the reinforcement layer on the aluminum layer.

In this method, a metal oxide is obtained by oxidizing the metal layer to form the reinforcement layer, and thus a connection force between the reinforcement layer and the metal layer is enhanced, so that the current conducting layer has high stability.

In a third aspect, a positive electrode sheet is provided, including an active material and the positive current collector as described above. The active substance is arranged on a surface of each of the first coating segment and the second functional segment. The positive electrode sheet employs the positive current collector provided by the present disclosure, which can be coated with a larger amount of the active material, thereby improving the energy density of the positive current collector. In addition, the thickness at the connection between the functional layer corresponding to the coating region of the positive current collector and the tab segment is increased, which further improves the electrical conductivity and the current conductivity of the positive electrode sheet.

In a fourth aspect, a cell is provided, including a negative electrode sheet, a separator layer, a shell, and the positive electrode sheet as described above. The negative electrode sheet, the separator layer and the positive electrode sheet are disposed in the shell. The cell includes the above positive electrode sheet, so that its energy density can be increased by 0.5% to 2%.

In a fifth aspect, a battery is provided, including a housing, the above cell, an insulation member and a top cover assembly. The cell is received within the housing. The insulation member is arranged between the cell and the housing. The top cover assembly covers the housing and is connected to the cell by a tab. The battery has a higher electric capacity, which can expand the use range of the battery, and can be applied to a device with a large electric power demand.

In the sixth aspect, the present disclosure also proposes a use of a positive current collectors in preparing of a lithium ion battery. The use of the positive current collector with good electrical conductivity and the current conductivity to improve the performance of the lithium ion battery will have a very good industrial application prospect.

BRIEF DESCRIPTION OF DRAWINGS

In order to clearly explain technical solutions of embodiments of the present disclosure, the accompanying drawings used in the description of the embodiments are briefly described below. It should be understood that the following accompanying drawings merely illustrate some embodiments of the present disclosure, and therefore should not be regarded as a limitation on the scope. For those of ordinary skill in the art, other related accompanying drawings may also be obtained without creative effort based on these drawings.

REFERENCE SIGNS

Figure 1:
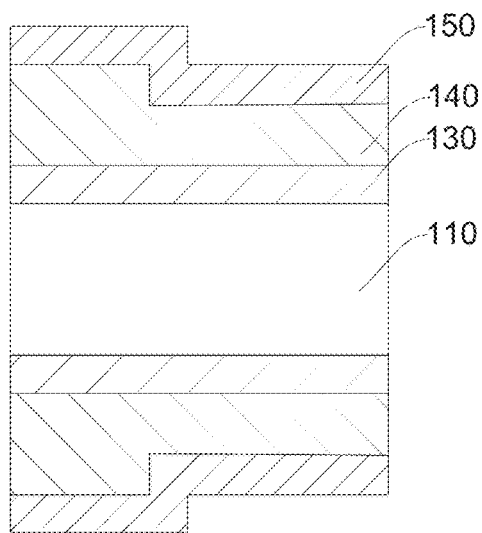
FIG. 1 is a schematic structural view of a positive current collector according to an embodiment of the present disclosure.

100—positive current collector; 110—substrate film; 111—first surface; 112—second surface; 120—functional layer; 121—first functional layer; 122—second functional layer; 130—bonding layer; 140—current conducting layer; 141—metal layer; 143—reinforcement layer; 150—protective layer; 210—first functional segment; 211—first coating segment; 212—first coating region; 213—tab segment; 214—tab region; 220—second functional segment; 221—second coating segment; 222—second coating region; 223—third coating segment; 224—third coating region.

DESCRIPTION OF EMBODIMENTS

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some, but not all embodiments of the present disclosure. The components of the embodiments of the present disclosure generally described and illustrated in the drawings herein may be arranged and designed in a variety of different configurations. Therefore, the following detailed description of the embodiments of the present disclosure provided in the accompanying drawings is intended to be merely representative of selected embodiments of the present disclosure, rather than limiting the scope of the disclosure as claimed. Based on the embodiments in the present disclosure, all other embodiments obtained by those of ordinary skill in the art without creative efforts shall fall within the scope of the present disclosure.

In the description of the present disclosure, it should be noted that the orientation or positional relationship indicated by the terms "upper," "lower," "left," "right," etc. is based on the orientation or positional relationship shown in the accompanying drawings, or is the orientation or positional relationship that the product of the present disclosure is usually placed in use, which is only for the convenience of describing the present disclosure and simplifying the description. The terms "first," "second," etc. are merely used for sectional description and should not be construed to indicate or imply relative importance.

Some embodiments of the present disclosure will be described in detail below with reference to the accompanying drawings.

Figure 2:
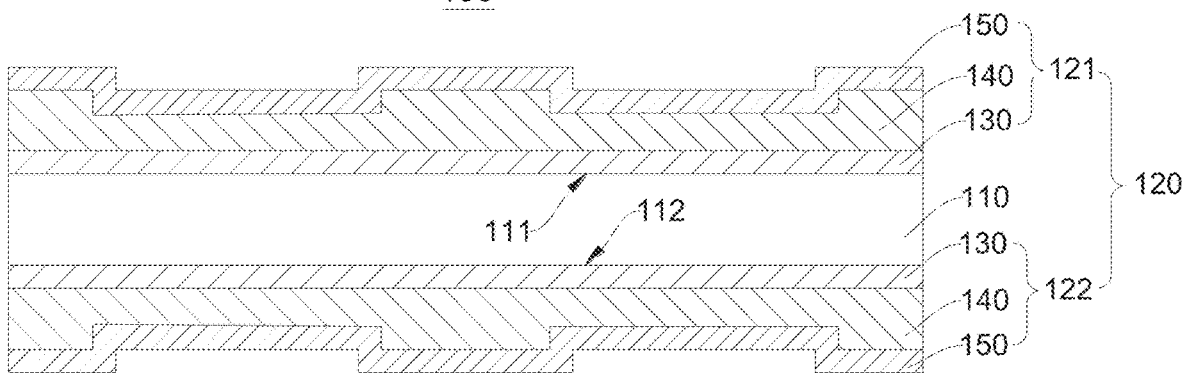
FIG. 2 is a schematic structural view of a positive current collector according to an embodiment of the present disclosure in another state.

Referring to FIG. 1 and FIG. 2, FIG. 1 is a schematic structural view of a positive current collector 100 according to the present embodiment, and FIG. 2 is a schematic structural view of the positive current collector 100 according to this embodiment of the present disclosure in another state.

The positive current collector 100 according to the embodiments of the present disclosure is applied in a cell of a lithium battery to collect and output a current generated by an active material of the battery. The positive current collector 100 has a multi-layer structure, including a substrate film 110 and a functional layer 120 arranged on the substrate film 110. In the embodiment of the present disclosure, the substrate film 110 may be made of o-phenylphenol (OPP), polyethylene terephthalate (PET), polyimide (PI), polyphenylene sulfide (PPS)), cast polypropylene (CPP), polyethylene naphthalate (PEN), polyvinyl chloride (PVC). In some embodiments of the present disclosure, the substrate film 110 may be made of PET, PPS or PEN. The substrate film 110 may be made of any one of the materials, or may be a composite film of two or more materials. In some embodiments of the present disclosure, the substrate film 110 is the substrate film 110. The substrate film 110 made of the above materials is light in weight, has good tensile property and good adhesion strength with the functional layer 120. In some embodiments of the present disclosure, the substrate film 110 has a thickness in a range of 1.2 μm to 12 μm. Here, the thickness of the substrate film 110 may be 1.2 μm, 1.5 μm, 2 μm, 3 μm, 4 μm, 5 μm, 6 μm, 7 μm, 8 μm, 9 μm, 10 μm, 11 μm or 12 μm.

Referring to FIG. 2, the substrate film 110 has an upper surface as a first surface 111, and a lower surface as a second surface 112. In the embodiment of the present disclosure, each of the first surface 111 and the second surface 112 has a functional layer 120 provided thereon. Further, the first surface 111 has a first functional layer 121 provided thereon, and the second surface 112 has a second functional layer 122 provided thereon. In other embodiments of the present disclosure, the functional layer 120 is arranged on one of the first surface 111 or the second surface 112 of the substrate film 110, which may be adjusted as desired. In this embodiment, the first functional layer 121 is of a same structure as the second functional layer 122, and the first functional layer 121 and the second functional layer 122 are symmetrically arranged with respect to the substrate film 110 to facilitate processing and preparation. Detailed description will be set forth below taken the first functional layer 121 as an example.

Figure 3:
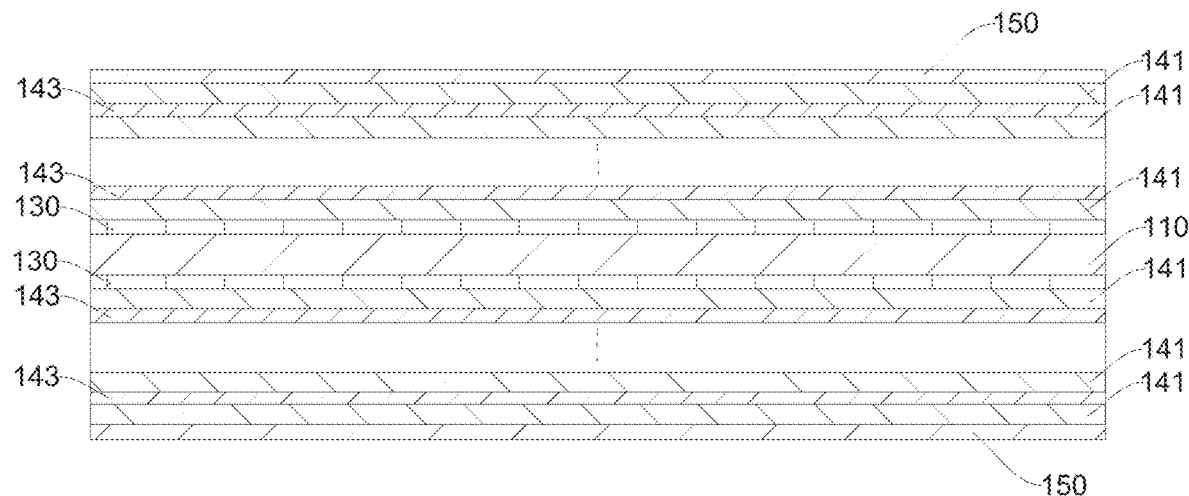
FIG. 3 is a schematic structural view of a part of a positive current collector with a uniform layer thickness according to an embodiment of the present disclosure.

Referring to FIG. 1 and FIG. 2, the first functional layer 121 includes a bonding layer 130, a current conducting layer 140, and a protective layer 150 that are stacked sequentially. The bonding layer 130 is arranged on the first surface 111. Referring to FIG. 3 showing a schematic structural view of a part of the positive current collector 100 with a uniform layer thickness, the current conducting layer 140 includes a metal layer 141 and a reinforcement layer 143 that are alternately stacked, and the dotted line in FIG. 3 represents the omitted multi-layer structures. It should be understood that the bonding layer 130 of the first functional layer 121 is arranged on the first surface 111, a metal layer 141 is arranged on the bonding layer 130, a reinforcement layer 143 is arranged on the metal layer 141, and a metal layer 141 is arranged on the reinforcement layer 143 again. Based on actual requirements, such as for adjusting a conductivity of the current conducting layer 140, the metal layer 141 and the reinforcement layer 143 are continuously arranged alternately, so that the current conducting layer 140 has a layer structure formed by alternately stacking the metal layer 141 and the reinforcement layer 143. Then, a protective layer 150 is arranged on a surface of the current conducting layer 140. In this embodiment, an outermost layer of the current conducting layer 140 is the metal layer 141, and the protective layer 150 is arranged on the metal layer 141 as the outermost layer.

FIG. 1 is a schematic structural view of a minimum unit of the positive current collector 100, and FIG. 2 is a schematic structural view of a plurality of uncut positive current collectors 100. During preparing the positive current collector 100, the substrate film 110 is a continuous film structure, and the bonding layer 130, the current conducting layer 140, and the protective layer 150 that have a predetermined structure are formed on the substrate film 110 sequentially, and then the film with a longer length is cut as desired to obtain the positive current collector 100.

In some embodiments of the present disclosure, the bonding layer 130 is a non-metallic coated film, and the non-metal includes at least one of SiC, $Si_3N_4$, $SiOx$ ($1.5 \leq x \leq 2$) and $AlOx$ ($1 \leq x \leq 1.5$). The non-metallic bonding layer may be formed by directly coating the above compounds on the substrate film 110 through an electron beam evaporation deposition or other methods, or may be directly formed by a reaction of a metal vapor, an organic metal source and an oxygen source such as oxygen and water through a similar chemical vapor deposition (CVD) method, which is not limited thereto in the present disclosure. In some embodiments of the present disclosure, the bonding layer 130 has a thickness in a range of 2 nm to 50 nm. The substrate film 110 can be stably connected to the current conducting layer 140 and the protective layer 150 by the bonding layer 130 with this structure, thereby ensuring usage performance of the positive current collector 100 to a large extent. In some embodiments, when the bonding layer is made of $AlOx$ ($1 \leq x \leq 1.5$), the bonding layer 130 has a thickness in a range of 8 nm to 20 nm; when the bonding layer is $SiOx$ ($1.5 \leq x \leq 2$), the bonding layer 130 has a thickness in a range of 10 nm to 40 nm. In some embodiments, the thickness of the bonding layer 130 may be 2 nm, 10 nm, 15 nm, 20 nm, 25 nm, 30 nm, 35 nm, 40 nm or 50 nm.

The existing positive current collector 100 is generally an aluminum foil. In the embodiment of the present disclosure, the metal layer 141 of the positive current collector 100 is an aluminum layer or an aluminum alloy. In some embodiments of the present disclosure, the metal layer 141 has a thickness in a range of 20 nm to 1500 nm. In some embodiments, the metal layer 141 has a thickness in a range of 20 nm to 1000 nm. Further, the thickness of the metal layer 141 may be 20 nm, 100 nm, 200 nm, 500 nm, 700 nm, 800 nm, 1000 nm, 1200 nm, 1300 nm or 1500 nm.

The reinforcement layer 143 in the present disclosure is a dense non-metallic layer 141 composed of metal oxides. In some embodiments of the present disclosure, the reinforcement layer 143 is $AlOx$ ($1 \leq x \leq 1.5$). The reinforcement layer 143 has a thickness in a range of 2 nm to 50 nm. In some embodiments of the present disclosure, the reinforcement layer 143 may have a thickness in a range of 3 nm to 6 nm, or the thickness of the reinforcement layer 143 may be 2 nm, 5 nm, 10 nm, 20 nm, 30 nm, 40 nm or 50 nm. The reinforcement layer 143 in the present disclosure may be formed through evaporation deposition or static curing. In the present disclosure, the current conducting layer 140 is consisted of the metal layer 141 and the reinforcement layer 143. Within the thickness range of the above metal layer 141 and the reinforcement layer 143, the metal layer 141 may include 2 to 50 layers, and the reinforcement layer 143 may include 1 to 49 layers. That is, the metal layer 141 includes more layers than the reinforcement layer 143 by one layer.

In some embodiments of the present disclosure, a protective layer 150 is arranged on an outermost layer of the positive current collector 100 to avoid the metal layer 141 from being oxidized, and thus the protective layer 150 is an anti-oxidation layer. In some embodiments of the present disclosure, the protective layer 150 is a non-metallic layer 141 or a metal layer 141. When the protective layer 150 is the metal layer 141, the metal layer may be made of Ni, and when the protective layer 150 is the non-metallic layer 141, the non-metallic layer may be made of SiC, $Si_3N_4$, $SiOx$ ($1.5 \leq x \leq 2$) or $AlOx$ ($1 \leq x \leq 1.5$). The protective layer 150 has a thickness in a range of 2 nm to 50 nm. In some embodiments of the present disclosure, the protective layer 150 may have a thickness in a range of 3 nm to 12 nm, or the thickness of the protective layer 150 may be 2 nm, 5 nm, 10 nm, 20 nm, 30 nm, 40 nm or 50 nm.

The existing current collector is of a uniform thickness structure. In practical applications, the inventors of the present disclosure found that since a region coated with an active material does not require high electrical conductivity, in order to ensure electrical conductivity of a tab connection region, the region coated with the active material has a greater thickness, which results in excess electrical conductivity and material wasting, thereby increasing costs.

The present disclosure proposes to design in which the positive current collector 100 has a nonuniform thickness so that the functional layer 120 corresponding to a tab region 214 has a greater thickness than a thickness of the functional layer 120 corresponding to the coating region. On the basis of ensuring an overcurrent capability of the positive current collector 100, the thickness of the functional layer 120 corresponding to the coating region is reduced, and an amount of the active material coated in the coating region is increased, so as to increase an energy density of a cell containing the positive current collector 100, thereby reducing the cost of the positive current collector 100 3% to 30%.

Figure 4:
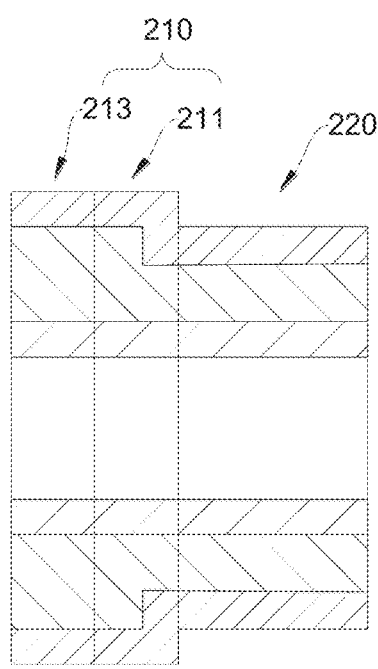
FIG. 4 is a schematic structural view of a division of a positive current collector according to an embodiment of the present disclosure.

Referring to FIG. 4, a schematic structural view of a division of a positive current collector 100 of the present disclosure is illustrated. In the embodiment of the present disclosure, the first functional layer 121 is divided to have a first functional segment 210 and a second functional segment 220 in a direction parallel to the first surface 111, and the first functional segment 210 has a thickness greater than a thickness of the second functional segment 220. Further, in order to ensure the electrical conductivity of the tab region 214 and also to greatly improve the electrical conductivity of the coating region, a ratio of the thickness of the first functional segment 210 to the thickness of the second functional segment 220 is (5 to 25):(1 to 15). In some embodiments of the present disclosure, the first functional segment 210 has a thickness in a range of 500 nm to 2500 nm, and the second functional segment 220 has a thickness in a range of 100 nm to 1500 nm. In some embodiments of the present disclosure, the thickness of the first functional segment 210 is 500 nm, 1000 nm, 1500 nm, 2000 nm, 2300 nm or 2500 nm, and the thickness of the second functional segment 220 is 100 nm, 500 nm, 800 nm, 1000 nm, 1200 nm or 1500 nm.

Figure 5:
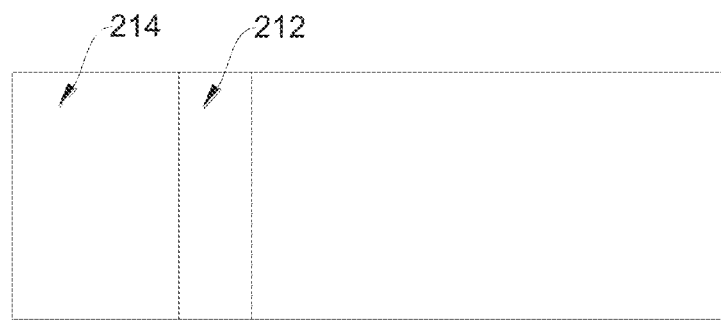
FIG. 5 is a schematic structural view of the positive current collector in FIG. 4 from another view.

Referring to FIG. 4 and FIG. 5, FIG. 5 is a schematic structural view of the positive current collector 100 in FIG. 4 from another view. The first functional segment 210 includes a first coating segment 211 and a tab segment 213. The tab segment 213 has a surface as the tab region 214 configured to be connected to a tab. The first coating segment 211 has a surface as the first coating region 212 where the active material is to be coated. The second functional segment 220 has a surface as a part of the coating region where the active material is to be coated. The first coating segment 211 is arranged between the tab segment 213 and the second functional segment 220. That is, the tab segment 213, the first coating segment 211 and the second functional segment 220 are connected sequentially. Compared with the structure in which the thickness of the functional layer 120 corresponding to the tab region 214 is greater than the thickness of the functional layer 120 corresponding to the coating region, with this structure, it is possible to increase the thickness of the functional layer 120, on a side close to the tab region 214, corresponding to the coating region. Since the positive current collector 100 has high requirements on current conductivity of a tab interface, such a structure can improve the electrical conductivity and the current conductivity at the connection between the coating region and the tab region 214, thereby avoiding short plate effect.

In order to further improve the overcurrent capability of the positive current collector 100, the surface of the first coating segment 211 in the direction parallel to the first surface 111 has a size in a range of 0.5 nm to 25 nm. It should be understood that the first coating region 212 has a width in a range of 0.5 nm to 25 nm. In some embodiments of the present disclosure, the first coating region 212 has a width in a range of 1 nm to 15 nm. The width of the first coating region 212 may be 0.5 nm, 1 nm, 5 nm, 10 nm, 15 nm, 20 nm or 25 nm.

Figure 6:
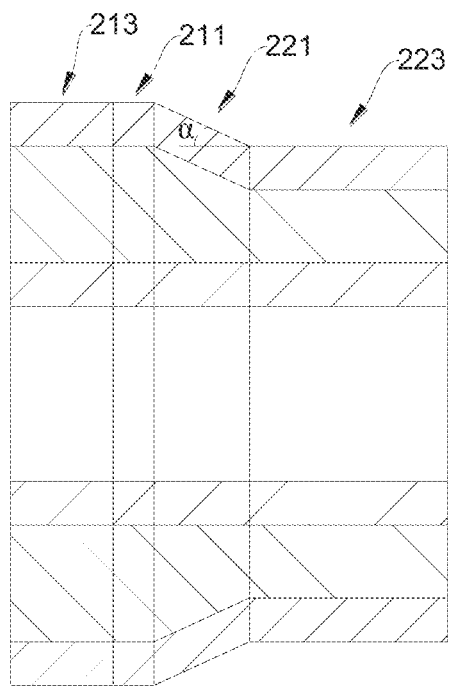
FIG. 6 is a schematic structural view of another positive current collector according to an embodiment of the present disclosure.
Figure 7:
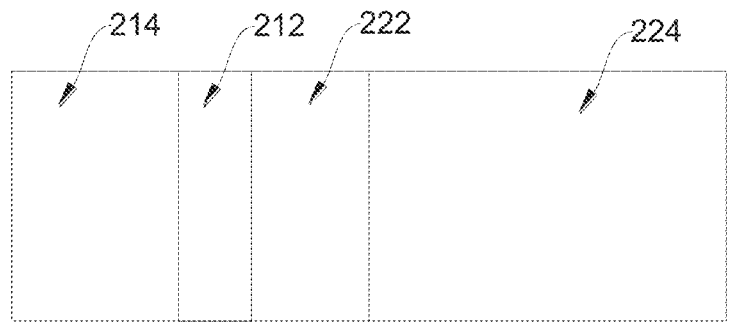
FIG. 7 is a schematic structural view of the positive current collector in FIG. 6 from another view.

Referring to FIGS. 6 and 7, FIG. 6 is another schematic structural view of a positive current collector 100 of the present disclosure, and FIG. 7 is a schematic structural view of the positive current collector 100 in FIG. 6 from another view. The inventors of the present disclosure have found that there is a certain limitation on the current conductivity of the functional layer 120 with the above structure. In order to break through this limitation, the inventors of the present disclosure have modified the structure of the second functional segment 220. In the embodiment of the present disclosure, the second functional segment 220 includes a second coating segment 221 and a third coating segment 223. The second coating segment 221 has a surface as the second coating region 222. The third coating segment 223 has a surface as the third coating region 224. The second coating segment 221 is arranged between the first coating segment 211 and the third coating segment 223, and has a thickness gradually decreasing from an end thereof close to the first coating segment 211 to an end thereof close to the third coating segment 223. That is, the first coating segment 211, the second coating segment 221, and the third coating segment 223 are connected sequentially to form a coating segment. The first coating region 212, the second coating region 222, and the third coating region 224 form a coating region. The first coating segment 211 has a thickness equal to a thickness of the tab region 214, the third coating segment 223 has a thickness equal to the thickness of the second functional segment 220, and the second coating segment 221 has a thickness gradually decreasing in a direction from the first coating segment 211 to the third coating segment 223. Such a structure can increase a contact area between the second functional segment 220 and the first functional segment 210, and improve the current conductivity at the connection between the second functional segment 220 and the first functional segment 210, thereby improving comprehensive overcurrent capability of the functional layer 120. Meanwhile, with this structure, it is possible to avoid film surface defects such as dead wrinkle and bulging from being generated at different thickness positions of the functional layer 120.

Figure 8:
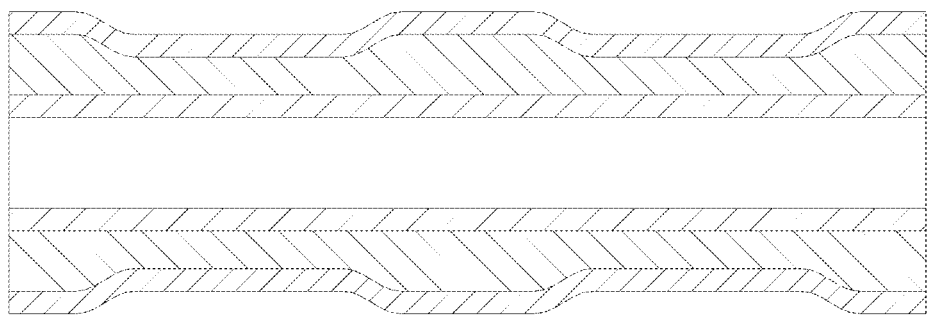
FIG. 8 is a schematic structural view of a plurality of positive current collectors in FIG. 6.
Figure 9:
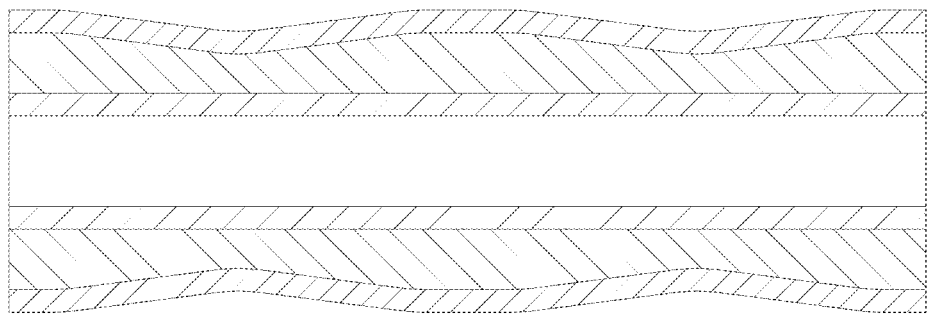
FIG. 9 is a schematic structural view of a plurality of still another positive current collectors according to an embodiment of the present disclosure.

Further, the second coating segment 221 has a flat surface or a curved surface. That is, the second coating region 222 has a flat surface or a curved surface. Referring to FIG. 6, in the embodiment of the present disclosure, the first functional segment 210 has a flat surface. In some embodiments of the present disclosure, an included angle α is formed between the surface of the second coating segment 221 and the surface of the first functional segment 210. When the angle ranges from 1 degree to 50 degrees, the overcurrent capability of the functional layer 120 is better. In some embodiments of the present disclosure, the angle ranges from 1 degree to 30 degrees. Referring to FIG. 6 and FIG. 8, FIG. 8 is a schematic structural view of a plurality of positive current collectors 100 in FIG. 6. When both the second coating segment 221 and the third coating segment 223 have flat surfaces, the surface of the first functional layer 121 has stepped shape. Referring to FIG. 9, FIG. 9 is another schematic structural view when a plurality of positive current collectors 100 are connected together. When both the second coating segment 221 and the third coating segment 223 have curved surfaces, the surface of the first functional layer 121 has a wavy shape. In other embodiments of the present disclosure, the shape of the surface of the second coating segment 221 and the surface shape of the third coating segment 223 may be varied as desired, which is not limited thereto in the present disclosure.

The positive current collector 100 according to the embodiments of the present disclosure has a functional layer 120 with a nonuniform thickness. The second functional layer 122 has a thickness smaller than a thickness of the first functional layer 121, and each of the second coating segment 221 and the third coating segment 223 has a thickness smaller than a thickness of the tab segment 213. Thus, more active materials can be coated in the coating region, thereby increasing the energy density of the positive current collector 100.

Further, the first coating segment 211 is arranged between the tab segment 213 and the second functional segment 220, and has a thickness equal to a thickness of the tab segment 213. By increasing the thickness of the functional layer 120 corresponding to the coating region, the electrical conductivity and the current conductivity at the connection between the coating region and the tab region 214 can be improved.

Furthermore, the second coating segment 221 has a thickness gradually decreasing from the end close to the first coating segment 211 to the end close to the third coating segment 223, which increases the contact area between the second functional segment 220 and the first functional segment 210, and improves the current conductivity at the connection between the second functional segment 220 and the first functional segment 210, thereby improving the comprehensive overcurrent capability of the functional layer 120.

The present disclosure also provides a battery (not shown) including a housing, a cell, an insulation member and a top cover assembly. The cell is received within the housing. The insulation member is arranged between the cell and the housing. The top cover assembly is covered over the housing and is connected to the cell by a tab. The cell includes a negative electrode sheet, a separator layer, an outer housing and a positive electrode sheet. The negative electrode sheet, the separator layer and the positive electrode sheet are arranged in the outer housing. The positive electrode sheet includes the positive current collector 100 and an active material coated on surfaces of the first coating segment 211 and the second functional segment 220. The positive current collector 100 may be coated with more active materials, so that an energy density of the cell containing the positive electrode sheet can be increased by 0.5% to 2%. Thus, the battery has a higher electric capacity and an expended use range, and can be applied to a device with a larger electric power demand.

The present disclosure also provides a preparation method of a positive current collector. The preparing method includes: forming a bonding layer on a first surface of a substrate film, forming a current conducting layer with a nonuniform thickness on the bonding layer, and forming a reinforcement layer on the current conducting layer. The preparation method of the positive current collector will be specifically described below.

During forming the bonding layer, the substrate film may be pre-processed before forming the bonding layer, including: performing a corona process on the first surface and the second surface of the substrate film, and then forming the bonding layer on a surface of the substrate film through an evaporation deposition. The bonding layer is made of a non-metal. In some embodiments of the present disclosure, the non-metal is at least one of SiC, Si3N4, SiOx ($1.5 \leq x \leq 2$) and AlOx ($1 \leq x \leq 1.5$).

In some embodiments of the present disclosure, forming the bonding layer includes: after placing the substrate film on which the corona or non-corona process is performed in a vacuum chamber of a single-sided or double-sided reciprocating vacuum coater, sealing the vacuum chamber; evacuating the vacuum chamber gradually until the vacuum chamber has a vacuum degree up to $10^{-4}$ Pa to $10^{-1}$ Pa; introducing compressed oxygen or ozone by an oxygen ventilation structure near an evaporation source; adjusting a ventilation rate, unwinding speed and winding speed; and evaporating a raw material by mans of the evaporation source to form the bonding layer on a moving substrate film. In a possible implementation, the evaporation source employs a metal aluminum wire or aluminum ingot to evaporate the raw material with a purity equal to or greater than 99.9% at the winding speed of 300 m/min to 400 m/min and a wire feeding amount of 250 mm/min to 350 mm/min, and evaporated aluminum atoms can react with oxygen to form a AlOx ($1 \leq x \leq 1.5$) layer on the moving substrate film, i.e., to form the bonding layer with a layer thickness of 2 nm to 50 nm. It should be noted that a value of x is determined according to the oxidation degree of the resulted AlOx in the embodiment of the present disclosure. When the aluminum is completely oxidized, x=1.5, and $Al_2O_3$ is obtained. When the aluminum is not completely oxidized, $1 \leq x \leq 1.5$.

In some embodiments of the present disclosure, forming the bonding layer includes: after placing the substrate film on which the corona or non-corona is performed in the vacuum chamber of the single-sided or double-sided reciprocating vacuum coater, sealing the vacuum chamber; evacuating the vacuum chamber gradually until the vacuum chamber has a vacuum degree up to $10^{-4}$ Pa to $10^{-1}$ Pa; colliding the raw material to be evaporated through accelerating electron bombardment by an electronic gun; adjust the unwinding speed, the winding speed and the evaporation amount; and forming a coating layer, i.e., the bonding layer on the surface of the moving substrate film after the raw material absorbs heat and vaporizes. In a possible implementation, the raw material to be evaporated is aluminum oxide, which can absorb heat and vaporizes to form a coating AlOx ($1 \leq x \leq 1.5$) layer on the surface of the substrate film.

In some embodiments of the present disclosure, forming the bonding layer includes: after placing the substrate film on which the corona or non-corona treatment is performed in the vacuum chamber of the single-sided or double-sided reciprocating vacuum coater, sealing the vacuum chamber; evacuating the vacuum chamber gradually until the vacuum chamber has a vacuum degree up to $10^{-4}$ Pa to $10^{-1}$ Pa; and performing a double-sided reciprocating high-efficiency coating on the substrate film through magnetron sputtering. In a possible implementation, a target material is high-purity alumina with a purity equal to or greater than 99.9%. After adjusting the unwinding speed and the winding speed, the sputtered alumina molecules form a AlOx ($1 \leq x \leq 1.5$) layer, i.e., the bonding layer, on the moving substrate film.

In some embodiments of the present disclosure, forming the bonding layer includes: after placing substrate film on which the corona or non-corona is performed in the vacuum chamber of the single-sided or double-sided reciprocating vacuum coater, sealing the vacuum chamber; evacuating the vacuum chamber gradually until the vacuum chamber has a vacuum degree up to $10^{-4}$ Pa to $10^{-1}$ Pa; performing a double-sided reciprocating high-efficiency coating on the substrate film through a magnetron sputtering. In a possible implementation, the target material is high-purity aluminum with a purity equal to or greater than 99.9%, and high-purity oxygen is introduced into a sputtering path, so that aluminum reacts with oxygen to form AlOx (1≤x≤1.5), which is deposited on the substrate film to form the bonding layer.

In some embodiments of the present disclosure, forming the bonding layer includes: placing the substrate film on which the corona or non-corona is performed in a continuous chemical vapor deposition equipment; and performing a gas ionization by using trimethyl aluminum or aluminum chloride as the aluminum source and oxygen, ozone, moisture, or carbon dioxide as the oxygen source and adjusting a gas ratio, the winding speed and the unwinding speed to deposit an aluminum oxide layer on the substrate film to form the bonding layer.

Forming the current conducting layer will be described below. The current conducting layer of the present disclosure includes the metal layer and the reinforcement layer. In some embodiments of the present disclosure, the metal layer is an aluminum layer, and the reinforcement layer is an oxide of aluminum, which will be described as an example below.

In some embodiments of the present disclosure, a perfluoropolyether oil that hinders aluminizing is selectively coated on the bonding layer, so that the aluminum layer is not easily formed on the bonding layer coated with the perfluoropolyether oil, thereby obtaining the aluminum layer of the nonuniform thickness. Specifically, the following steps are included.

At step 1, a perfluoropolyether oil is coated on a part of a surface of the bonding layer corresponding to the first coating segment and a part of the surface of the bonding layer corresponding to the second functional segment to form a coating having a thickness gradually decreasing from the surface of the bonding layer corresponding to the first coating segment towards the surface of the bonding layer corresponding to the second functional segment. Then, the surface of the bonding layer is aluminized. During the aluminizing, an aluminum layer is not initially formed on the surface of the bonding layer coated with perfluoropolyether oil. With the increase of the aluminizing, the perfluoropolyether oil gradually decreases and then disappears. At this time, the aluminum layer is formed on the surface of the bonding layer that had been coated with perfluoropolyether oil. In this method, an aluminum layer with a predetermined structure and a nonuniform thickness is formed on the bonding layer by combining the unwinding speed and an evaporation amount of the substrate film.

At step 2, a reinforcement layer is formed on the aluminum layer obtained in the step 1. The above step refers to the previous step, and it refers to step 1 herein. Forming the reinforcement layer of the present disclosure includes:

placing an aluminized film whose outermost layer is the aluminum layer within an environment with a humidity less than 50% and keeping the aluminized film stationary for 46 to 50 hours to form the reinforcement layer on the aluminum layer. In this method, an AlOx (1≤x≤1.5) layer is formed by a reaction between the aluminum layer and the oxygen in the environment to obtain the reinforcement layer; or cleaning and oxidizing a surface of the aluminum layer by ionizing argon and oxygen with a plasma device to form the reinforcement layer on the aluminum layer. In this method, an AlOx (1 layer is formed by oxidizing the aluminum on the surface of the aluminum layer to obtain the reinforcement layer.

It should be noted that, when the reinforcement layer is made of other materials, the reinforcement layer may be formed on the aluminum layer by conventional technical means in the art such as evaporation deposition and magnetron sputtering.

At step 3, the reinforcement layer obtained in the step 2 is aluminized to form an aluminum layer, thereby obtaining a current conducting layer with a nonuniform thickness. When the previously formed aluminum layer has a predetermined thickness, the aluminizing may be normally carried out. When it is necessary to continue to form an aluminum layer with a nonuniform thickness, the perfluoropolyether oil is coated on the reinforcement layer obtained in the step 2 by the same coating means as the step 1. After the aluminizing, aluminum is deposited on the reinforcement layer coated with perfluoropolyether oil. Here, the perfluoropolyether oil may be replaced by other solutions with low surface dyne values.

It should be noted that, since the aluminum layer in the embodiment of the present disclosure has a multi-layer structure, the perfluoropolyether oil may be coated during each aluminizing to obtain the aluminum layer with the nonuniform thickness, or the perfluoropolyether oil may be selectively coated, and the specific preparation process is adjustable as desired, which is not limited thereto in the present disclosure. When forming the multi-layered aluminum layer and reinforcement layer, the steps 2 and 3 are repeated to form the reinforcement layer and the aluminum layer that are alternately stacked, until the current conducting layer has a predetermined thickness.

In some embodiments of the present disclosure, a water-cooling baffle is employed to control an amount of an aluminum vapor formed at different positions of the bonding layer, so as to obtain the aluminum layer with the nonuniform thickness. Specifically, the following steps are included.

At step 1, a water-cooling baffle is arranged between a surface of the bonding layer corresponding to the second functional segment and an evaporation source. The water-cooling baffle has a plurality of through-holes to allow vapor to pass therethrough. The plurality of through-holes is arranged at an arrangement density gradually decreasing in a direction from the first functional segment to the second functional segment, and aluminum is deposited on a surface of the bonding layer through an evaporation deposition. Due to the water-cooling baffle, an amount of the aluminum deposited on the surface of the bonding layer is different, and the aluminum layer with a predetermined structure and a nonuniform thickness is formed by combining with the winding speed and the evaporation amount. It should be noted that other structures of the evaporation mechanism employed in the present disclosure are existing structures, which are not limited thereto in the present disclosure.

At step 2, the reinforcement layer is formed on the aluminum layer obtained in the step 1. Here, forming the reinforcement layer is the same as that described above. An aluminized film whose outermost layer is an aluminum layer is placed within an environment with a humidity less than 50% and keeping the aluminized film stationary for 46 to 50 hours to form the reinforcement layer on the aluminum layer. By this method, an AlOx (1≤x≤1.5) layer is formed by the reaction between the aluminum layer and the oxygen in the environment to obtain the reinforcement layer, or a surface of the aluminum layer is cleaned and oxidized by ionizing argon and oxygen with a plasma device to form the reinforcement layer on the aluminum layer. By this method, an AlOx (1≤x≤1.5) layer is formed by oxidizing the aluminum on the surface of the aluminum layer to obtain the reinforcement layer.

At step 3, an aluminum layer is formed on the reinforcement layer obtained in the step 2 by the evaporation deposition of the step 1 to obtain the current conducting layer with the nonuniform thickness.

It should be noted that the aluminum layer of the embodiment of the present disclosure has a multi-layer structure. The water-cooling baffle may be employed during each aluminizing to obtain the aluminum layer with the nonuniform thickness, or the water-cooling baffle may be selectively employed, and the specific preparation process is adjustable as desired, which is not limited thereto in the present disclosure. When forming the multi-layered aluminum layer and the reinforcement layer, the steps 2 and 3 are repeated to form the reinforcement layer and the aluminum layer that are alternately stacked, until the current conducting layer has a predetermined thickness.

Forming the protective layer will be described below. The protective layer of the embodiment of the present disclosure may be a metal layer or a non-metallic layer, and a protective layer of different materials may be formed on the current conducting layer based on the respective materials. In some embodiments of the present disclosure, the protective layer is an AlOx (1≤x≤1.5) layer. Forming the protective layer includes:

placing the film formed with the current conducting layer within a room temperature environment with a humidity less than 50% and keeping the aluminized film stationary for 46 to 50 hours. In this case, a denser oxide layer, i.e., a protective layer with anti-oxidation, will be formed on the surface of the aluminized film due to a penetration of oxygen or a small amount of water in the air; or placing the film formed with the current conducting layer within a vacuum chamber of a single-sided or double-sided evaporation coater containing a plasma device, sealing the vacuum chamber, evacuating the vacuum chamber gradually until the vacuum chamber has a vacuum degree up to $10^{-4}$ Pa to $10^{-1}$ Pa. and cleaning and oxidizing the surface of the aluminized film by the plasma device without opening an evaporation source, to form a relatively denser AlOx (1.4≤x≤1.5) layer, i.e., the protective layer; or placing the film formed with the current conducting layer within a high-temperature ozone reaction device, adjusting a reaction temperature and ozone content to form a relatively dense AlOx (1.4≤x≤1.5) layer, i.e., the protective layer, on the surface of the aluminized film.

The features and properties of the present disclosure will be further described in detail below with reference to the embodiments.

Example 1

The present embodiment provides a positive current collector and a preparation method thereof, including the following steps At S1, a corona treatment is first performed on a surface of a substrate film to be coated, and the substrate film has a thickness of 12 μm. Then, the rolled substrate film is placed within a vacuum chamber of a vacuum coater. The vacuum chamber is then sealed, and is evacuated gradually until the vacuum chamber has a vacuum degree up to $5\times10^{-2}$ Pa. A compressed oxygen is introduced by an oxygen-introduction structure near an evaporation source at introduction volumes of 4000 sccm and 3500 sccm. A raw material to be evaporation-coated by the evaporation source is a metal aluminum wire or an aluminum ingot with a purity greater than or equal to 99.9%. A winding speed is set as 350 m/min, and a wire feeding rate is set as 300 mm/min. Evaporated aluminum atoms react with oxygen to form an $Al_2O_3$ oxide layer, i.e., a bonding layer, on a moving thin film, and this layer has a thickness of about 10 nm.

At S2, the film formed with the bonding layer on the surface obtained in S1 is placed within a vacuum chamber of a single-sided or double-sided reciprocating evaporation coater including a plasma device. The vacuum chamber is sealed, and is evacuated gradually until the vacuum chamber has a vacuum degree up to $2\times10^{-2}$ Pa. Before entering an evaporation region, the surface of the bonding layer is cleaned by ionizing argon with the plasma device at an argon amount of 500 sccm, and then is coated with a perfluoropolyether oil at a fixed point with a fixed width to obtain a coating layer with a uniform thickness.

Then, in the evaporation coating region, aluminum with a purity of greater than or equal to 99.9% is heated by means of evaporation. The winding speed is set as 300 m/min, and the wire feeding rate is set as 1100 mm/min. The aluminum continues to be melted and evaporated in an evaporation mechanism to form an aluminized layer, i.e., an aluminized metal layer, with a nonuniform thickness, on the surface of the bonding layer, and the aluminized metal layer has a maximum thickness of about 50 nm to 55 nm at a thickest part thereof.

At S3, the aluminized film obtained in S2 is placed within the vacuum chamber of the single-sided or double-sided reciprocating evaporation coater including the plasma device. Then, the vacuum chamber is sealed, and is evacuated gradually until the vacuum chamber has a vacuum degree up to $2\times10^{-2}$ Pa. Before entering the evaporation region, the surface of the aluminized film is cleaned and oxidized by ionizing argon and oxygen with the plasma device at an argon amount of 500 sccm and an oxygen amount of 350 sccm, to form a denser $Al_2O_3$ oxide layer, i.e., a reinforcement layer, on the surface of the aluminized metal layer, and the reinforcement layer has a thickness of about 4 nm.

Then, in the evaporation coating region, aluminum with a purity of greater than or equal to 99.9% is heated by means of evaporation, and a unwinding speed, the winding speed and an evaporation amount are adjusted, so that the aluminum continues to be melted and evaporated in the evaporation mechanism to form an aluminized layer on the surface of the bonding layer.

According to the design of single-sided and double-sided molding of the device, this step is repeated by 40 times to obtain a current conducting layer formed by alternately stacking the metal layer and the reinforcement layer, and an outermost layer of the current conducting layer is an aluminum layer.

At S4, the aluminized film obtained from S3 is placed within a room temperature environment with a humidity smaller than 50% and for 48 hours for standing and curing. A denser $Al_2O_3$ oxide layer, i.e., a protective layer, will be formed on the surface of the aluminized film due to a penetration of oxygen or a small amount of water in the air, and the protective layer has a thickness of about 3 nm.

Through the above steps, the positive current collector with the nonuniform thickness can be obtained and has a structure shown in FIG. 1.

Example 2

The present embodiment provides a positive current collector and a preparation method thereof, which differs from Example 1 only in that: when the perfluoropolyether oil is coated in S2, the coating layer has a thickness gradually decreasing from a part of a surface of the bonding layer corresponding to a first coating segment to a part of the surface of the bonding layer corresponding to a second functional segment. After evaporation deposition, an aluminized layer with a nonuniform thickness is formed on the surface of the bonding layer, and thus has a gradually variable thickness.

The positive current collector with the nonuniform thickness obtained in this example has a structure shown in FIG. 6.

Example 3

The present embodiment provides a positive current collector and a preparation method thereof, including the following steps.

At S1, a corona treatment is first performed on a surface of a substrate film to be coated, and the substrate film has a thickness of 12 μm. Then, the rolled substrate film is placed within a vacuum chamber of a vacuum coater. The vacuum chamber is sealed, and is evacuated gradually until the vacuum chamber has a vacuum degree up to $5 \times 10^{-2}$ Pa. A compressed oxygen is introduced by an oxygen-introduction structure near an evaporation source at introduction volumes of 4000 sccm and 3500 sccm. A raw material to be evaporation-deposited by the evaporation source is a metal aluminum wire or an aluminum ingot with a purity greater than or equal to 99.9%. A winding speed is set as 350 m/min, and a wire feeding rate is set as 300 mm/min. Evaporated aluminum atoms react with oxygen to form an $Al_2O_3$ oxide layer, i.e., a bonding layer, on a moving thin film, and this layer has a thickness of about 10 nm.

At S2, the film formed with the bonding layer on the surface obtained in S1 is placed within a vacuum chamber of a single-sided or double-sided reciprocating evaporation coater including a plasma device. The vacuum chamber is sealed, and is evacuated gradually until the vacuum chamber has a vacuum degree up to $2 \times 10^{-2}$ Pa. Before entering an evaporation region, the surface of the bonding layer is cleaned by ionizing argon with the plasma device at an argon amount of 600 sccm.

Then, in the evaporation coating region, a water-cooling baffle is arranged between the bonding layer and the evaporation source, so that the water-cooling baffle can shield a part of a surface of the bonding layer corresponding to a second functional segment. The water-cooling baffle in this embodiment has a plurality of through-holes defined thereon, and the plurality of is capable of allowing vapor to pass therethrough and arranged by a uniform arrangement density. Aluminum with a purity of greater than or equal to 99.9% is heated by means of evaporation. The winding speed is set as 380 m/min, and the wire feeding rate is set as 900 mm/min. The aluminum continues to be melted and evaporated in an evaporation mechanism to form an aluminized layer, i.e., an aluminized metal layer, with a nonuniform thickness, on the surface the bonding layer, and the aluminized metal layer has a thickness of about 60 nm to 65 nm.

At S3, the aluminized film obtained in S2 is placed within the vacuum chamber of the single-sided or double-sided reciprocating evaporation coater including the plasma device. The vacuum chamber is sealed, and is evacuated gradually until the vacuum chamber has a vacuum degree up to $2 \times 10^{-2}$ Pa. Before entering the evaporation region, the surface of the aluminized film is cleaned and oxidized by ionizing argon and oxygen with the plasma device at an argon amount of 600 sccm and an oxygen amount of 400 sccm, to form a denser $Al_2O_3$ oxide layer, i.e., a reinforcement layer, on the surface of the aluminized metal layer, and the reinforcement layer has a thickness of about 4 nm.

Then, in the evaporation region, the water-cooling baffle as described above is arranged between the bonding layer and the evaporation source. Aluminum with a purity of greater than or equal to 99.9% is heated by means of evaporation. The unwinding speed, the winding speed and the evaporation amount are adjusted. The aluminum continues to be melted and evaporated in an evaporation mechanism to form an aluminized layer on the surface of the bonding layer.

According to the design of single-sided and double-sided molding of the device, this step is repeated by 30 times to obtain a current conducting layer formed by alternatively stacking the metal layer and the reinforcement layer, and an outermost layer of the current conducting layer is an aluminum layer.

At S4, the aluminized film obtained in S3 is placed within the vacuum chamber of the single-sided or double-sided evaporation coater including the plasma device. The vacuum chamber is sealed, and is evacuated gradually until the vacuum chamber has a vacuum degree up to $5 \times 10^{-3}$-$5 \times 10^{-2}$ Pa. Without opening the evaporation source, the surface of the aluminized film is cleaned and oxidized by ionizing argon and oxygen with the plasma device to form a denser $Al_2O_3$ oxide layer, i.e., an anti-oxidation layer, and the $Al_2O_3$ oxide layer has a thickness of about 4 nm.

The positive current collector with the nonuniform thickness is obtained through the above steps. Since the through-holes of the water-cooling baffle are uniformly arranged, the resulted aluminum layer has a thickness varying uniformly. The positive current collector is of a same structure as the positive current collector of Example 1 expect for the different thicknesses.

Example 4

The present embodiment provides a positive current collector and a preparation method thereof, which differs from Example 3 only in that: at S2, a water-cooling baffle is arranged between the bonding layer and the evaporation source, so that the water-cooling baffle can shield the surface of the bonding layer corresponding to the second functional segment. The water-cooling baffle in this embodiment has a plurality of through-holes defined thereon. The plurality of through-holes is capable of allow vapor to pass therethrough, and arranged at an arrangement density gradually decreasing as desired. During evaporation depositing the metal aluminum on the bonding layer, due to the different arrangement density of the plurality of through-holes of the water-cooling baffle, the resulted aluminum layer has a nonuniform thickness to obtain the aluminum layer with a gradually variable thickness.

The positive current collector with the nonuniform thickness obtained in this embodiment has a structure shown in FIG. 6, which is the same as that of the positive current collector in Example 2 expect for the different thicknesses.

Example 5

This embodiment provides a positive current collector and a preparation method thereof, which differs from Example 3 only in that the substrate film used in this embodiment has a thickness of 6 μm.

Compared with Example 3, the thickness of the substrate film used in this example is reduced, so that mechanical properties of the positive current collector are changed.

Example 6

The present embodiment provides a positive current collector and a preparation method thereof, which differs from Example 3 only in that: at S1, a corona treatment is first performed on the surface of the substrate film to be coated, and the substrate film has a thickness of 12 μm. Then, the rolled substrate film is placed within a vacuum chamber of a vacuum coater. The vacuum chamber is then sealed, and is evacuated gradually until the vacuum chamber has a vacuum degree up to $5 \times 10^{-2}$ Pa. An aluminum oxide raw material with a purity greater than or equal to 99.9% is evaporation deposited through accelerating an electron bombardment and collision by an electron gun. The winding speed is set as 350 m/min. The raw material absorbs heat and vaporizes to form a coating layer, i.e., a bonding layer, on the surface of the moving substrate film, and the bonding layer has a thickness of about 10 nm.

Example 7

The present embodiment provides a positive current collector and a preparation method thereof, which differs from Example 3 only in that: at S4, the aluminized film obtained in S3 is placed within a high-temperature ozone reaction device, and a reaction temperature and an ozone content are adjusted to form a denser $Al_2O_3$ oxide layer, i.e., a protective layer, on the surface of the aluminized film, and the oxide layer has a thickness of about 4 nm.

Comparative Example 1

The present embodiment provides a positive current collector and a preparation method thereof, which differs from Example 1 only in that: the perfluoropolyether oil is not coated at S2 and S3, and the evaporation aluminized layer has a uniform thickness. The positive current collector obtained in this embodiment has a structure with a uniform thickness.

Comparative Example 2

This comparative example provides a common positive current collector.

Test Example 1

The first functional segment and the second functional segment of the positive current collectors according to Examples 1 to 7 and Comparative Examples 1 to 2 were tested for electrical conductivity by using a square resistance meter and a balance, and the testing is described below.

Square Resistance Test:
1. A sample of an entire width was tested from a side thereof by a four-pin square resistance tester, and square resistance of the entire width was measured in a transverse (TD) direction.
2. A probe of the square resistance meter needed to be perpendicular to a surface of the film, and was pressed to the end, until a displayed value was stable and recorded.
3. In the same way, three rows in a longitudinal (MD) direction were tested and the data was recorded.

Balance Electrical Conductivity Test:
1. A sample of an entire width was taken, and an A4 pad was placed under the film to flat the surface. A cutting was performed by a rotary cutter to collect 10 samples of average equally-divided positions in the TD direction.
2. The balance was first calibrated to check whether the balance level was in the middle balance position, which showing that the weight was reset to zero.
3. The sample was placed on the balance platform, and the balance display value was recorded after the balance display value was stable.
4. The thickness was calculated after testing the product quality:(finished product quality−original film quality)/sample density/sample area 100.
5. Calculation of electrical conductivity: thickness (nm) *square resistance (mΩ).

Mechanical performance test using high-speed rail tensile machine:
1. A sample of an entire width was taken to obtain strips with a width of 15 mm and a length of 200 mm in the TD and MD directions.
2. An initial distance of the tensile machine was set as 50 mm, and a test speed was 50 mm/min; the tensile machine fixture was used to flatten the strip and clamp both ends of the sample for testing.
3. TD, MD samples are tested by means of this method and the testing is recorded.

The test results are shown in the following table.

TABLE 1

| | Performance test results of first functional segment | | | | | | | |
|---|---|---|---|---|---|---|---|---|
| | Square resistance (mΩ) | Resistivity (Ω · m) | Transverse tensile strength (MPa) | Longitudinal tensile strength (MPa) | Transverse elongation at break | Longitudinal elongation at break | Dyne value | Firmness |
| Example 1 | 45 | $4.5 \times 10^{-8}$ | 185 | 193 | 91% | 102% | 56 | Qualified |
| Example 2 | 48 | $4.3 \times 10^{-8}$ | 204 | 211 | 93% | 100% | 56 | Qualified |
| Example 3 | 42 | $4.0 \times 10^{-8}$ | 197 | 205 | 94% | 103% | 56 | Qualified |
| Example 4 | 43 | $3.9 \times 10^{-8}$ | 203 | 210 | 91% | 104% | 56 | Qualified |
| Example 5 | 42 | $3.8 \times 10^{-8}$ | 221 | 229 | 21% | 32% | 56 | Qualified |
| Example 6 | 45 | $3.8 \times 10^{-8}$ | 200 | 201 | 100% | 103% | 56 | Qualified |
| Example 7 | 42 | $4.0 \times 10^{-8}$ | 200 | 204 | 95% | 102% | 56 | Qualified |
| Comparative Example 1 | 45 | $4.5 \times 10^{-8}$ | 185 | 193 | 91% | 102% | 56 | Qualified |
| Comparative Example 2 | / | $2.7 \times 10^{-8}$ | 188 | 190 | 2.3% | 2.2% | 28 | Qualified |

TABLE 2

Performance test results of second functional segment

| | Square resistance (mΩ) | Resistivity (Ω · m) | Transverse tensile strength (MPa) | Longitudinal tensile strength (MPa) | Transverse elongation at break | Longitudinal elongation at break | Dyne value | Firmness |
|---|---|---|---|---|---|---|---|---|
| Example 1 | 75 | $4.8 \times 10^{-8}$ | 220 | 193 | 95% | 102% | 56 | Qualified |
| Example 2 | 80 | $4.5 \times 10^{-8}$ | 224 | 211 | 105% | 100% | 56 | Qualified |
| Example 3 | 77 | $5.6 \times 10^{-8}$ | 215 | 205 | 94% | 103% | 56 | Qualified |
| Example 4 | 79 | $6.0 \times 10^{-8}$ | 230 | 210 | 110% | 124% | 56 | Qualified |
| Example 5 | 73 | $3.9 \times 10^{-8}$ | 215 | 204 | 36% | 41% | 56 | Qualified |
| Example 6 | 78 | $5.8 \times 10^{-8}$ | 210 | 206 | 95% | 97% | 56 | Qualified |
| Example 7 | 78 | $5.5 \times 10^{-8}$ | 210 | 208 | 95% | 98% | 56 | Qualified |
| Comparative Example 1 | 45 | $4.5 \times 10^{-8}$ | 185 | 193 | 91% | 102% | 56 | Qualified |
| Comparative Example 2 | / | $2.7 \times 10^{-8}$ | 188 | 190 | 2.3% | 2.2% | 28 | Qualified |

It can be seen from Table 1 and Table 2 that, compared with the Comparative Example 1 and the Comparative Example 2, the positive current collectors in Examples 1 to 4, 6 and 7 of the present disclosure have better electrical properties and mechanical properties. Example 5 has a thin substrate film, which affects the mechanical properties of the positive current collector. The positive current collectors in Examples 1 to 4, 6 and 7 of the present disclosure are divided to have two functional segments including a first functional segment and a second functional segment. The first functional segment has a square resistance in a range of 40 mΩ to 50 mΩ, a resistivity in a range of $3.5 \times 10^{-8}$ Ω·m to $4.5 \times 10^{-8}$ Ω·m, a transverse tensile strength in a range of about 185 MPa to 220 MPa, and a longitudinal tensile strength in a range of about 190 MPa to 230 MPa. The second functional segment of Example 1 to 4, 6 and 7 has a square resistance in a range of 75 mΩ to 80 mΩ, a resistivity in a range of $3.5 \times 10^{-8}$ Ω·m to $6.0 \times 10^{-8}$ Ω·m, a transverse tensile strength in a range of about 210 MPa to 230 MPa, a longitudinal tensile strength in a range of about 190 MPa to 260 MPa, a transverse elongation at break in a range of about 94% to 110%, and a longitudinal elongation at break in a range of about 95% to 130%. The positive current collector has a dyne value of about 56.

The above descriptions are only preferred embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included within the scope of the present disclosure.

INDUSTRIAL APPLICABILITY

In the positive current collector and the preparation method thereof, as well as the positive electrode sheet, the cell and the battery provided by the embodiments of the present disclosure, through the modification of the first functional layer and the second functional layer in the positive current collector and by increasing the thickness of the functional layer at the connection between the coating segment and the tab segment, the electrical conductivity and the current conductivity at the connection between the coating region and the tab region can be improved, and the comprehensive overcurrent capability of the positive current collector can be also improved. The positive electrode sheet, the cell and the battery may be prepared and formed, and may be applied in the field of lithium ion battery to improve the performance of the lithium ion battery, which has a very broad industrial application prospect.

What is claimed is:

1. A preparation method of a positive electrode current collector, wherein the positive electrode current collector comprises:
    a substrate film having a first surface and a second surface opposite to the first surface; and
    a functional layer arranged on a surface of the substrate film, and comprising a first functional layer provided on the first surface of the substrate film and a second functional layer provided on the second surface of the substrate film,
    wherein the first functional layer comprises a bonding layer, a current conducting layer, and a protective layer that are stacked sequentially, the bonding layer being arranged on the first surface; and
    wherein the first functional layer is divided to have a first functional segment and a second functional segment in a direction parallel to the first surface, the first functional segment having a thickness greater than a thickness of the second functional segment; and
    wherein the first functional segment comprises a first coating segment and a tab segment, the first coating segment having a surface to be coated with a material, and the tab segment having a surface to be connected to a tab, wherein the first coating segment is arranged between the tab segment and the second functional segment,
    the preparation method comprising:
    forming the bonding layer on the first surface and the second surface of the substrate film;
    forming the current conducting layer on the bonding layer; and
    forming the protective layer on the current conducting layer,
    wherein the current conducting layer comprises a metal layer and a reinforcement layer that are alternately stacked, and has a nonuniform thickness, and wherein said forming the current conducting layer comprises:
    step 1: coating a perfluoropolyether oil on a part of a surface of the bonding layer corresponding to the second functional segment, and then aluminizing the surface of the bonding layer,
    wherein optionally, the second functional segment comprises a second coating segment and a third coating segment, the second coating segment being arranged between the first functional segment and the third coating segment; the perfluoropolyether oil is coated on a part of the surface of the bonding layer corresponding to the first coating segment and the part of the surface of the bonding layer corresponding to the second functional segment to form a coating layer having a thickness gradually decreasing from the part of the surface of the bonding layer corresponding to the first coating segment towards the part of the surface of the bonding layer corresponding to the second functional segment;

step 2: forming the reinforcement layer on an aluminum layer obtained in step 1;

step 3: aluminizing the reinforcement layer obtained in the step 2 to form an aluminum layer, to obtain a current conducting layer with a nonuniform thickness; and optionally, repeating steps 2 and 3 to form the reinforcement layer and the aluminum layer that are alternately stacked, until the current conducting layer has a predetermined thickness.

2. The preparation method of the positive electrode current collector according to claim 1 wherein said forming the reinforcement layer on the aluminum layer comprises:

placing an aluminized film, an outermost layer of which is the aluminum layer, in an environment with a humidity less than 50% and keeping the aluminized film stationary for 46 to 50 hours to form the reinforcement layer on the aluminum layer.

3. The preparation method of the positive electrode current collector according to claim 1, wherein:

a ratio of the thickness of the first functional segment to the thickness of the second functional segment is (5 to 25):(1 to 15); and optionally, the thickness of the first functional segment is in a range of 500 nm to 2500 nm, and the thickness of the second functional segment is in a range of 100 nm to 1500 nm.

4. The preparation method of the positive electrode current collector according to claim 1, wherein the surface of the first coating segment has a size ranging from 0.5 nm to 25 nm in the direction parallel to the first surface.

5. The preparation method of the positive electrode current collector according to claim 1, wherein the second functional segment comprises a second coating segment and a third coating segment, the second coating segment being arranged between the first coating segment and the third coating segment and having a thickness gradually decreasing from an end thereof close to the first coating segment to an end thereof close to the third coating segment.

6. The preparation method of the positive electrode current collector according to claim 5, wherein the second coating segment has a curved surface.

7. The preparation method of the positive electrode current collector according to claim 1, wherein the current conducting layer comprises 2 to 50 metal layers and 1 to 49 reinforcement layers that are alternately stacked, and wherein each of the 2 to 50 metal layers has a thickness in a range of 20 nm to 1500 nm, and optionally, each of the 1 to 49 reinforcement layers has a thickness in a range of 2 nm to 50 nm.

8. The preparation method of the positive electrode current collector according to claim 7, wherein:

the substrate film has a thickness in a range of 1.2 µm to 12 µm;

the bonding layer has a thickness in a range of 2 nm to 50 nm; and the protective layer has a thickness in a range of from 2 nm to 50 nm.

9. The preparation method of the positive electrode current collector according to claim 1, wherein:

the second functional layer is of a same structure as the first functional layer; and the second functional layer and the first functional layer are symmetrically arranged with respect to the substrate film.

10. The preparation method of the positive electrode current collector according to claim 7, wherein:

the metal layer is an aluminum layer;

the reinforcement layer is a non-metallic layer, and is composed of AlOx, where $1 \le x \le 1.5$;

optionally, the protective layer is a non-metallic layer, and is composed of AlOx, where $1 \le x \le 1.5$.

11. A preparation method of a positive electrode current collector, wherein the positive electrode current collector comprises:

a substrate film having a first surface and a second surface opposite to the first surface; and a functional layer arranged on a surface of the substrate film, and comprising a first functional layer provided on the first surface of the substrate film and a second functional layer provided on the second surface of the substrate film, wherein the first functional layer comprises a bonding layer, a current conducting layer, and a protective layer that are stacked sequentially, the bonding layer being arranged on the first surface; and wherein the first functional layer is divided to have a first functional segment and a second functional segment in a direction parallel to the first surface, the first functional segment having a thickness greater than a thickness of the second functional segment; and wherein the first functional segment comprises a first coating segment and a tab segment, the first coating segment having a surface to be coated with a material, and the tab segment having a surface to be connected to a tab, wherein the first coating segment is arranged between the tab segment and the second functional segment, the preparation method comprising:

forming the bonding layer on the first surface and the second surface of the substrate film;

forming the current conducting layer on the bonding layer; and forming the protective layer on the current conducting layer, wherein the current conducting layer comprises a metal layer and a reinforcement layer that are alternately stacked, and has a nonuniform thickness, and wherein said forming the current conducting layer comprises:

step 1: arranging a water-cooling baffle between a part of a surface of the bonding layer corresponding to the second functional segment and an evaporation source, and aluminizing the part of the surface of the bonding layer by evaporation deposition, wherein the water-cooling baffle has a plurality of through-holes defined therein, the plurality of through-holes being configured to allow vapor to pass therethrough and arranged at an arrangement density gradually decreasing in a direction from the first functional segment to the second functional segment;

step 2: forming the reinforcement layer on an aluminum layer obtained in the step 1;

step 3: forming an aluminum layer on the reinforcement layer obtained in the step 2 by the evaporation deposition in the step 1, to obtain a current conducting layer with a nonuniform thickness; and optionally, repeating steps 2 and 3 to form the reinforcement layer and the aluminum layer that are alternately stacked, until the current conducting layer has a predetermined thickness.

12. The preparation method of the positive electrode current collector according to claim 11, wherein said forming the reinforcement layer on the aluminum layer comprises:

placing an aluminized film, an outermost layer of which is the aluminum layer, in an environment with a humidity less than 50% and keeping the aluminized film stationary for 46 to 50 hours to form the reinforcement layer on the aluminum layer; or cleaning and oxidizing a surface of the aluminum layer by ionizing argon and oxygen with a plasma device to form the reinforcement layer on the aluminum layer.

13. The preparation method of the positive electrode current collector according to claim 11, wherein:

a ratio of the thickness of the first functional segment to the thickness of the second functional segment is (5 to 25):(1 to 15); and optionally, the thickness of the first functional segment is in a range of 500 nm to 2500 nm, and the thickness of the second functional segment is in a range of 100 nm to 1500 nm.

14. The preparation method of the positive electrode current collector according to claim 11, wherein the surface of the first coating segment has a size ranging from 0.5 nm to 25 nm in the direction parallel to the first surface.

15. The preparation method of the positive electrode current collector according to claim 11, wherein the second functional segment comprises a second coating segment and a third coating segment, the second coating segment being arranged between the first coating segment and the third coating segment and having a thickness gradually decreasing from an end thereof close to the first coating segment to an end thereof close to the third coating segment.

16. The preparation method of the positive electrode current collector according to claim 15, wherein the second coating segment has a flat surface or a curved surface;

optionally, each of the second coating segment and the third coating segment has a flat surface, and an included angle formed between the flat surface of the second coating segment and the flat surface of the third coating segment ranges from 1 degree to 50 degrees.

17. The preparation method of the positive electrode current collector according to claim 11, wherein the current conducting layer comprises 2 to 50 metal layers and 1 to 49 reinforcement layers that are alternately stacked, and wherein each of the 2 to 50 metal layers has a thickness in a range of 20 nm to 1500 nm, and optionally, each of the 1 to 49 reinforcement layers has a thickness in a range of 2 nm to 50 nm.

18. The preparation method of the positive electrode current collector according to claim 17, wherein:

the substrate film has a thickness in a range of 1.2 μm to 12 μm;

the bonding layer has a thickness in a range of 2 nm to 50 nm; and the protective layer has a thickness in a range of from 2 nm to 50 nm.

19. The preparation method of the positive electrode current collector according to claim 11, wherein:

the second functional layer is of a same structure as the first functional layer; and the second functional layer and the first functional layer are symmetrically arranged with respect to the substrate film.

20. The preparation method of the positive electrode current collector according to claim 17, wherein:

the metal layer is an aluminum layer;

the reinforcement layer is a non-metallic layer, and is composed of AlOx, where 1≤x≤1.5;

optionally, the protective layer is a non-metallic layer, and is composed of AlOx, where 1≤x≤1.5.

* * * * *